(12) United States Patent
Federici et al.

(10) Patent No.: US 9,051,688 B2
(45) Date of Patent: Jun. 9, 2015

(54) AQUEOUS POLYMER COMPOSITION FOR PAPER COATING

(71) Applicants: Franco Federici, Busto Arsizio (IT); Vittorio Betti, Castronno (IT); Thierry Bossi, Azzio (IT); Christian Parisi, Milan (IT); Riccardo Vago, Arcisate (IT); Giovanni Floridi, Novara (IT); Giuseppe Li Bassi, Gavirate (IT)

(72) Inventors: Franco Federici, Busto Arsizio (IT); Vittorio Betti, Castronno (IT); Thierry Bossi, Azzio (IT); Christian Parisi, Milan (IT); Riccardo Vago, Arcisate (IT); Giovanni Floridi, Novara (IT); Giuseppe Li Bassi, Gavirate (IT)

(73) Assignee: LAMBERTI SPA, Alizzate (IT)

( * ) Notice: Subject to any disclaimer, the term of this patent is extended or adjusted under 35 U.S.C. 154(b) by 0 days.

(21) Appl. No.: 14/356,686

(22) PCT Filed: Nov. 7, 2012

(86) PCT No.: PCT/EP2012/072002
§ 371 (c)(1),
(2) Date: May 7, 2014

(87) PCT Pub. No.: WO2013/068382
PCT Pub. Date: May 16, 2013

(65) Prior Publication Data
US 2014/0316043 A1    Oct. 23, 2014

(30) Foreign Application Priority Data
Nov. 11, 2011  (IT) .............. VA2011A0030

(51) Int. Cl.
| | | |
|---|---|---|
| *D21H 19/58* | (2006.01) | |
| *C09D 171/02* | (2006.01) | |
| *C08L 71/00* | (2006.01) | |
| *C08L 71/02* | (2006.01) | |
| *D21H 19/62* | (2006.01) | |
| *C08G 18/48* | (2006.01) | |
| *C08F 220/18* | (2006.01) | |
| *C08L 33/14* | (2006.01) | |

(52) U.S. Cl.
CPC .............. *D21H 19/58* (2013.01); *C09D 171/02* (2013.01); *C08L 33/14* (2013.01); *C08L 71/00* (2013.01); *C08L 71/02* (2013.01); *D21H 19/62* (2013.01); *C08G 2650/56* (2013.01); *C08G 18/4895* (2013.01); *C08F 220/18* (2013.01)

(58) Field of Classification Search
CPC ..................... C08F 220/18; G08G 2650/56
USPC ................................... 524/378, 507
See application file for complete search history.

(56) References Cited

U.S. PATENT DOCUMENTS

| | | |
|---|---|---|
| 4,325,856 A | 4/1982 | Ishikawa et al. |
| 4,654,397 A | 3/1987 | Mueller-Mall et al. |
| 4,814,373 A | 3/1989 | Frankel et al. |
| 2010/0184897 A1 | 7/2010 | Dupont et al. |
| 2011/0319500 A1* | 12/2011 | Suau .......... 514/772.6 |

FOREIGN PATENT DOCUMENTS

| | | |
|---|---|---|
| EP | 0060430 B1 | 9/1982 |
| WO | 0196007 A1 | 12/2001 |
| WO | 03/046038 A1 | 6/2003 |
| WO | 2004041883 A1 | 5/2004 |
| WO | 2004044022 A1 | 5/2004 |
| WO | 2007069037 A1 | 6/2007 |
| WO | 2010106022 A1 | 9/2010 |
| WO | 2010106023 A1 | 9/2010 |
| WO | 2013068382 A1 | 5/2013 |

* cited by examiner

*Primary Examiner* — Doris Lee
(74) *Attorney, Agent, or Firm* — Mossman, Kumar & Tyler PC

(57) ABSTRACT

The present invention concerns aqueous polymer compositions comprising a water soluble hydrophilic polymer with poly(ethylene oxide) content higher than 50% by weight and a polyacrylic thickener containing sulfonic groups. The aqueous polymer compositions of the invention are useful as deflocculants, rheology modifiers and water retention agents for paper coating compositions.

16 Claims, No Drawings

AQUEOUS POLYMER COMPOSITION FOR PAPER COATING

FIELD OF THE INVENTION

The present invention concerns aqueous polymer compositions comprising a water soluble hydrophilic polymer with a poly(ethylene oxide) content higher than 50% by weight and a polyacrylic thickener comprising sulfonic acid groups. The present invention additionally relates to paper coating compositions containing the above described aqueous polymer compositions as deflocculant, rheology modifier and water retention agent.

PRIOR ART

Hydrophilic polymers containing poly(ethylene oxide) chains, i.e. —($CH_2$—$CH_2O$)— repeating units, are known in the art and have been widely described in the patent literature.

EP 60430 discloses a process for making a polyurethane having poly(alkylene oxide) side-chains characterised in that the poly(alkylene oxide) used as starting alcohol has at least two free hydroxy groups separated by not more than 3 carbon atoms that react with diisocyanates. The resulting polyurethanes may be used to stabilise or destabilise foams, emulsions and dispersions. They may also be used with pigments and fillers.

WO 03/046038 describes a broad family of polyurethane dispersants comprising from 35 to 90% by weight of poly($C_{2-4}$-alkylene oxide) based on the total weight of the polyurethane polymer, wherein not less than 60% by weight of the poly($C_2$-$C_4$-alkylene oxide) is poly(ethylene oxide) and at least 5% of the poly($C_{2-4}$-alkylene oxide) is incorporated in lateral chains.

It is also known to use water soluble polymers containing poly(ethylene oxide) in paper coating compositions, as water retention agents and gloss enhancers. As an example, WO 2010/106022 and WO 2010/106023 describe water soluble comb polyurethanes comprising a main chain (backbone) containing urethane and urea linkages with multiple trifunctional branch points (branch points) from each of which a poly(ethylene oxide) side-chains emanates, the comb polyurethanes being characterized by containing poly(ethylene oxide) side-chains having molecular weight higher than 500, preferably from 2,000 to 20,000, and ethylene oxide content from 80 to 99.9% by weight. They are said to be suitable as paper coating additives, as water retention agents and gloss enhancers in paper coating compositions.

WO 01/96007, WO 2004/044022, WO 2004/041883 and WO 2007/069037 describe the use of polyacrylic anionic copolymers in the paper industry, for making or coating paper; the polyacrylic anionic copolymers contain at least one anionic ethylenically unsaturated monomer having monocarboxylic functionality and at least one non-ionic ethylenically unsaturated monomer having poly($C_{2-4}$-alkylene oxide) functionalities. They are said to be useful in paper coating as dispersing agents, as agents for improving the optical brightening activation, as water retention agents, as viscosity and gloss enhancers.

In spite of the several different functions that the above polymers perform in paper coating compositions, they do not show sufficient thickening power and the preparation of paper coatings usually requires the addition of rheology modifiers (thickener) to opportunely modulate their viscosity. Typical useful thickener are carboxymethyl cellulose, hydroxypropyl guar, hydroxypropylmethyl cellulose, xanthan, ASE polymers ("Alkali Swellable Emulsion" polymers) or HASE polymers ("Hydrophobically modified Alkali Swellable Emulsion" polymers).

It would be advantageous in the field to have stable formulations of paper coating additives and rheology modifiers that could combine in one single product most of the functions that are need to prepare paper coating compositions. Unfortunately the interactions between several rheology modifiers and the above mentioned hydrophilic paper coating polymers often compromise the stability of the mixture and/or their performances.

According to US 2010/0184897 an aqueous formulation containing a hydrophilic polyethoxylated comb (meth)acrylic acid polymer and a generic acrylic thickener is claimed to be stable and to maintain the properties of both the components if the comb polymer is partially neutralized in such way that the pH of said formulation is between 5.5 and 6.8. This aqueous formulation can be used profitably as additive for paper coating compositions.

The procedure of US 2010/0184897 suffers from the drawback that it requires a neutralization step and, as the person skilled in the art knows well, the neutralisation of an emulsion polymer is a critical task, especially on industrial scale, and must be performed very carefully, because it may lead to coagulation of the polymer in the emulsion, to formation of gel particles or to emulsions with short term stability. Moreover it is time consuming.

Now we have found that an aqueous polymer composition comprising a hydrophilic water soluble polymer with a poly(ethylene oxide) content higher than 50% by weight and a specific polyacrylic thickener obtained by polymerization of a mixture of monomers containing an unsaturated monomer containing a sulfonic acid group is stable over a wide pH range and do not require any pH correction. The polymer composition of the invention shows a high stability in presence of electrolytes, has good thickening and water retention properties and, at the same time, it acts as gloss enhancer for paper coating compositions; the paper coatings prepared using the above described aqueous polymer compositions have good stability and impart good printability and excellent gloss to coated paper.

SUMMARY OF THE INVENTION

It is therefore object of the present invention an aqueous polymer composition comprising:
A) a water soluble hydrophilic polymer with poly(ethylene oxide) content higher than 50% by weight;
B) a polyacrylic thickener obtained by polymerization of:
  a) from 0.1 to 20% by weight, preferably from 1 to 10% by weight, of a monoethylenically unsaturated monomer containing a sulfonic acid group or a salt thereof;
  b) from 20 to 70% by weight, preferably from 40 to 70% by weight, of a (meth)acrylic acid ester;
  c) from 20 to 50% by weight, preferably from 30 to 45% by weight, of a monoethylenically unsaturated monomer containing one or more carboxylic acid groups;
  d) from 0 to 3% by weight, preferably from 0 to 1% by weight, of a polyethylenically unsaturated monomer;
  e) from 0 to 15% by weight of a nonionic acrylic associative monomer;
in which the weight ratio between the water soluble hydrophilic polymer A) and polyacrylic thickener B) is from 60/40 to 90/10 and the sum of the polymers A) and B) represents from 10 to 40% by weight, preferably from 10 to 25% by weight, of the composition itself.

Another object of the invention are paper coating compositions comprising: a) from 30 to 80% by weight of an inorganic pigment; b) from 0.05 to 5.0 parts by weight each 100 parts by weight of pigment of the above described aqueous polymer composition; c) at least 15% by weight of water.

DETAILED DESCRIPTION

In the aqueous polymer composition of the invention, preferably, the weight ratio between polymers A) and B) is from 80/20 to 90/10.

The water soluble hydrophilic polymer has preferably a poly(ethylene oxide) content higher than 80% by weight.

It can be any water soluble hydrophilic polymer commonly used in the field and well known to the person skilled in the art, for example those described in the literature mentioned above. It can have both a polyurethane or a polyacrylic or a polyether backbone.

In one preferred embodiment, the hydrophilic polymer of the invention has a polyurethane backbone and is a non-ionic comb polyurethane comprising a main chain containing urethane and urea linkages with branch points from each of which a linear poly(ethylene oxide) side-chains emanates, the comb polyurethanes being characterized by the fact that the poly(ethylene oxide) side-chains have molecular weight higher than 500 and poly(ethylene oxide) content from 80 to 99.9% by weight. These polyurethanes are described in detail in WO 2010/106022 and WO 2010/106023.

In another embodiment said hydrophilic polymer has a polyurethane backbone and is a water soluble comb non-ionic polyurethane comprising a main chain containing urethane and urea linkages with branching points from each of which a linear poly(alkylene oxide) side-chains having each molecular weight higher than 500 emanates, the comb polyurethane being characterized by having poly(ethylene oxide) content higher than 60% by weight and poly(propylene oxide) content from 5 to 30% by weight. Further details about the characteristic and the preparation of these comb polyurethanes can be found in the Italian patent application IT2010VA000068.

In a further embodiment, the water soluble hydrophilic polymer has a polyether backbone and is a polyether having poly(ethylene oxide) content higher than 60% by weight which is obtained by reacting: a) 1 equivalent of a polyol which is the reaction product of 1 equivalent of a monofunctional alcohol containing a polyoxyethylene chain —(CH$_2$CH$_2$O)$_n$— in which n is a number comprised between 15 and 500, and 1 equivalent of a diglycidyl ether of formula (I):

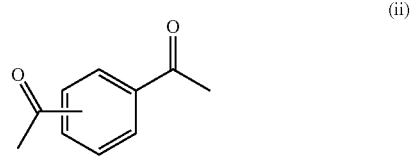

in which R$_1$ is the radical (i):

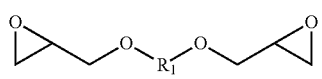

in which R$_2$, R$_3$ are each independently methyl, ethyl or hydrogen;
or R$_1$ is phenylene, optionally substituted with one or more alkyl group;
or R$_1$ is biphenylene, optionally substituted with one or more alkyl group;
or R$_1$ is the radical (ii):

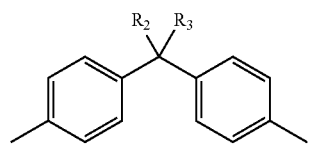

or R$_1$ is a linear or branched aliphatic alkylene radical containing from 2 to 6 carbon atoms; b) from 0.4 to 1.3 equivalents of a diglycidyl ether of formula (I); c) from 0 to 1 equivalent of a monofunctional alcohol. These polyethers are described in detail in the Italian patent application IT 2010VA000066.

In still another embodiment, the water soluble hydrophilic polymer has a polyacrylic backbone and is an acrylic anionic copolymer, such as those described in WO 01/96007, WO 2004/044022, WO 2004/041883, WO 2007/069037 and US 2010/0184897.

The most preferred hydrophilic polymer with poly(ethylene oxide) content higher than 50% by weight is the polyether described in IT 2010VA000066 and in particular the polyether obtained by reacting 1 equivalent of polyol a) with from 0.4 to 0.9 equivalents of diglycidyl ether b) of formula (I) in which R$_1$ is the radical (i) wherein R$_2$ and R$_3$ are methyl groups, with 0 equivalents of monofunctional alcohol c).

The monoethylenically unsaturated monomer containing a sulfonic acid group or salt thereof (e.g. an alkali metal salt or an ammonium salt) useful for the preparation of the polyacrylic thickener includes, among others, alkyl hydrocarbon-sulfonic acids, such as vinylsulfonic acid, allylsulfonic acid and methallylsulfonic acid, and, salts thereof; aromatic hydrocarbon-sulfonic acids, such as p-styrenesulfonic acid, isopropenylbenzenesulfonic acid, 2-chlorostyrenesulfonic acid and vinyloxybenzenesulfonic acid, and salts thereof; sulfoalkyl esters of acrylic acid and of methacrylic acid, such as-sulfoethyl (meth)acrylate and sulfopropyl (meth)acrylate, and salts thereof and sulfoalkyl amides of acrylic acid and of methacrylic acid such as 2-acrylamido-2-methylpropanesulfonic acid (AMPS) and salts thereof. The most preferred monomer containing a sulfonic acid group for use in the invention is 2-acrylamido-2-methylpropanesulfonic acid or one of its salt.

Beside the unsaturated monomer containing a sulfonic acid group, the polyacrylic thickener of the disclosure is obtained by co-polymerization of monoethylenically unsaturated monomers containing one or more carboxylic groups, one or more (meth)acrylic esters, and, optionally, one or more polyethylenically unsaturated monomer and/or one or more non-ionic acrylic associative monomer.

A large proportion of monoethylenically unsaturated monomers containing one or more carboxylic groups is essential to provide a polymeric structure which solubilises in water to provide high thickening performances when reacted with an alkali, like sodium hydroxide. Acrylic acid, methacrylic acid, itaconic acid, crotonic acid, fumaric acid, citraconic acid, mesaconic acid, maleic acid and mixtures thereof are examples of monoethylenically unsaturated monomer containing one or more carboxylic acid groups that are useful for the preparation of the polyacrylates of the present disclosure. Also monoesters of unsaturated dicarboxylic acids, such monoethyl maleate or monobutyl maleate, can be used. Methacrylic acid is the preferred monoethylenically unsaturated monomer containing a carboxylic group.

Useful (meth)acrylic acid esters are $C_1$-$C_{40}$ (meth)acrylic acid alkyl ester, such as methyl, ethyl, n-propyl, isopropyl, n-butyl, isobutyl, 2-ethylhexyl, octyl, lauryl (meth)acrylates and mixtures thereof. Preferably the (meth)acrylic acid ester is ethyl acrylate.

The polyethylenically unsaturated monomer can be any of the known polyfunctional derivatives that undergo radical polymerization with (meth)acrylic monomers. Among the useful polyethylenically unsaturated monomers we cite diallyl maleate, allyl methacrylate, diallyl phthalate, N-methylene-bis-acrylamide, pentaerithritol ether polyacrylates triallyl cyanurate.

The nonionic acrylic associative monomer may be selected among (meth)acrylic acid esters of $C_8$-$C_{30}$ alkyl, alkylaryl or polycyclic hydrocarbyl monoether of a polyethylene glycol having from 2 up to 70 oxyethylene units, preferably having 6 to 40 oxyethylene units, these esters having general formula $H_2C=C(R)-CO-O(CH_2CH_2O)_n-R'$, wherein R is H or $CH_3$, the latter being preferred, n is at least 2, and preferably has an average value of at least 6, up to 40 to 60 or even up to 70 or so, and R' is a hydrophobic group, for example an alkyl, alkylaryl, or polycyclic group having 8 to 30 carbon atoms, more preferably having of 12 to 18 carbon atoms.

It is also possible to include additional, minor amounts of one or more monoethylenically unsaturated monomers different from those mentioned above in the preparation of the polyacrylic thickener according to the present invention. These other monoethylenically unsaturated monomers can be different nonionic acrylic monomers, a styrene derivative, a vinyl compound, any mixture thereof or any other suitable monoethylenically unsaturated compound. Examples of such compounds include acrylonitrile, methacrylonitrile, acrylamide, methacrylamide, N-methyl acrylamide, 2-hydroxyethyl acrylate, 2-hydroxyethyl methacrylate, styrene, alpha-methyl styrene, 3-methyl styrene, 4-methyl styrene, t-butyl styrene, vinyl acetate or other vinyl esters and vinyl chloride. However, these monomers should be used only in minor amounts, generally lower than 20 and preferably lower than 10% by weight on the sum of the monomers.

The polyacrylic thickener according to the present invention can be prepared by polymerization processes which are generally known in the art, and particularly by emulsion or dispersion polymerization processes, for example as disclosed in U.S. Pat. Nos. 4,325,856, 4,654,397 and 4,814,373. These processes can be modified as necessary to polymerize the above described monomers based on the generally known principles.

The polymerization process that is preferred for the preparation of the polycrylic thickenere B) is emulsion polymerization.

In the preparation of the polyacrylic thickeners, surfactants commonly used in emulsion polymerization may be employed, such as anionic and/or nonionic emulsifiers, for example, alkali metal or ammonium alkyl sulfates, alkyl sulfonic acids, fatty acids, and oxyethylated alkyl phenols. The amount of surfactant used is usually 0.1% to 6% by weight, based on the total weight of monomers. Thermal or redox initiation processes may be used. Conventional free radical initiators may be used such as, for example, hydrogen peroxide, t-butyl hydroperoxide, t-amyl hydroperoxide, alkali or ammonium persulfates, and azo initiators such as 4,4'-azobis (4-cyanopentanoic acid), and 2,2'-azobisisobutyronitrile ("AIBN"), typically at a level of 0.01 to 3.0% by weight, based on the weight of total monomer. Redox systems using the same initiators coupled with a suitable reductant such as, for example, sodium hydroxymethanesulfinate, sodium hydrosulfite, isoascorbic acid, hydroxylamine sulfate and sodium bisulfite may be used at similar levels, optionally in combination with metal ions such as, for example iron and copper, optionally further including complexing agents for the metal.

Chain transfer agents such as mercaptans may be used to lower the molecular weight of the polymers.

The monomer mixture may be added in the reactor neat or as an emulsion in water. The monomer mixture may be added in a single addition or in multiple additions or continuously over the reaction period using a uniform or varying composition. The emulsion polymerization process may utilize a preformed seed emulsion polymer such as, for example, by adding about 5% (based on total monomer) of the monomer mixture into the reactor and making it react previously. Techniques to reduce residual monomers such as, for example, subjecting the reaction mixture to steam stripping, hold times, and additional radical sources may be employed.

A typical temperature range for the polymerization reaction is about 20° C. to about 110° C. with about 50° C. to about 90° C. being preferred.

The preferred method is to produce the polyacrylic thickeners B) in a monomer continuous addition emulsion polymerization process (also known as semi-continuous). In this case, the ingredients are metered into the reactor such that the rate of monomer addition controls the rate of polymerization. Under these conditions, monomers are consumed as fast as they enter the reactor thereby eliminating monomer build-up and composition drift and the polymer formed has the same composition as the feed.

In a further preferred method during the continuous monomer addition a solution of a bicarbonate salt, such as sodium bicarbonate, is metered in the reactor in such an amount to maintain the pH of the reaction mass in the range from 4.0 to 5.5.

The polyacrylic thickener, when dissolved in water at a concentration of 1% by weight of dry matter and at pH 9.0, has a Brookfield® viscosity (20 rpm and 20° C.) of at least 200 mPa*s.

The aqueous polymer composition of the invention can be prepared by simply mixing the solution of the water soluble hydrophilic polymer with poly(ethylene oxide) content higher than 50% by weight with the emulsion or dispersion of the polyacrylic thickener. This operation do not require any pH correction or optimization.

The aqueous polymer composition has a Brookfield® viscosity, measured at 25° C. and 100 rpm, ranging from 50 to 1000 mPa*s, preferably from 50 to 500 mPa*s and a pH comprised between 2.5 and 7.

The paper coating compositions of the invention comprise a) from 30 to 80% by weight of inorganic pigment; b) from 0.05 to 5.0 parts by weight each 100 parts by weight of pigment of the above described aqueous polymer composition; c) at least 15% by weight of water, and have Brookfield® viscosity at 25° C. and 100 rpm of less than 3,200 mPa*s, preferably from 500 to 2,500 mPa*s.

As the polymer composition of the invention does not act per-se as pigment dispersant, the paper coating compositions according to the present invention can also comprise from 0.01 to 3% by weight of a dispersing agent. Usually this dispersant is an anionic un-crosslinked polyacrylate derivative, such as sodium polyacrylate, having an average molecular weight from 1,500 to 20,000, as determined by GPC with standard of polyacrylic acid.

The paper coating compositions of the invention can comprise from 0.1 to 0.6% by weight of another thickener commonly used in the field. Typical useful rheology modifiers are carboxymethyl cellulose, hydroxypropyl guar, hydroxypropylmethyl cellulose, xanthan, sodium alginates, etc.

The inorganic pigments of the paper coating compositions, preferably having from 40 to 90% of the particles finer than 2 microns, are those normally employed in the coating of paper, and in particular are kaolin, calcium carbonate, talc, titanium dioxide, barium sulfate, gypsum or mixtures thereof. Dispersing agents, which are common ingredients of paper coating compositions, are not generally able to prevent the flocculation of the finest particles, especially when the paper coating composition is being applied on the paper sheet, i.e. under high stress conditions, and the particles flocculation is detrimental to smoothness and gloss of the resulting coated paper. On the contrary the aqueous polymer compositions of the invention are particularly effective as deflocculants, avoiding the formation of clusters of fine particles, which may tend to settle.

The paper coating compositions of the invention normally also comprise from 1 to 15% by weight of a binder, preferably a polymeric acrylic binder. Among the polymeric acrylic binders preferred for the realisation of the invention we cite the polymers of acrylic or methacrylic acid esters, the copolymers of acrylic ester monomers with vinyl acetate, styrene, butadiene or mixture thereof. Other conventional additives, such as defoaming agents, biocides, optical brighteners, may be present in the paper coating compositions.

As compared to paper coating compositions prepared from the known polymeric coating additives, those containing the polymer composition according to the present invention are surprisingly stable in their dispersion form, has optimal water retention properties, adhere well to substrates, and result in coatings with improved gloss and brightness. In the areas of paper coatings, and the like, these are obviously highly advantageous property combinations and not obtained from currently available compositions. Moreover these properties of the coating are very advantageous in view of the treatments which the coated paper receives in offset and other printing processes.

Another advantageous characteristic of the aqueous polymer compositions of the invention is the fact that they act as rheology and water retention buffers over different batches of industrial paper coating compositions having same recipe; this means that, in the industrial coating process, the usual deviations from the theoretical amounts of coating ingredients does not affect the rheology and water retention characteristics.

EXAMPLES

Preparation of a Polyacrylic Thickener

An aqueous monomer mixture was prepared by combining 7.7 g of a 30% solution of sodium lauryl sulfate, 183.4 g of ethyl acrylate, 117.0 g of methacrylic acid, 18.3 g of AMPS and 349.3 grams of water. The mixture was vigorously stirred to provide a uniform white emulsion.

248.7 grams of water and 7.7 g of a 30% solution of sodium lauryl sulfate were transferred into an glass reaction vessel equipped with a mechanical stirrer, heating mantle, thermometer, condenser and dropping funnel.

The reactor content was heated under stirring to 80° C. and 30 g of monomer emulsion were added together with 0.05 g of ammonium persulfate dissolved in 2.47 g of water. After 10 min the monomer emulsion and 0.5 g of ammonium persulfate dissolved in 60 g of water were metered in the reactor in 120 min.

At the end of the addition the temperature was maintained at about 80° C. for 30 min. The polymer emulsion obtained was then cooled to 65° C. and the residual monomers were eliminated with three addition with a time interval of 15 min of 0.5 g of $H_2O_2$ and a solution of ascorbic acid 0.3 g in 1.0 g of water. The polyacrylic thickener (AT1) has a 29.0% by weight of dry matter content and a pH of 3.0. A 1.0% (dry matter) solution thereof, brought to pH 9.0 with NaOH, provides a viscosity of 860 mPa*s at 25° C. and 20 rpm.

Preparation of a Polyether Water Soluble Hydrophilic Polymer 400.0 g (0.08 mol) of butoxy-(polyethylene glycol) with average molecular weight 5,000 g/mol were transferred in a reaction vessel equipped with internal thermometer, stirrer and condenser and heated to 115° C. Subsequently 1.75 g of 40% KOH and 15.2 g (0.04 mol) of D.E.R. 331 (epoxy resin from DOW Chemical Co.) were added.

The reaction temperature was maintained for 2 hours until disappearance of the epoxide groups.

12.2 g (0.032 mol) of D.E.R. 331 were then added and the reaction temperature was maintained for 3 other hours until disappearance of the epoxide groups.

200.0 g of the reaction product was dissolved under stirring in 600.0 g of water. The obtained product (PE1) has a dry matter content of 26.34% by weight, viscosity 74 mPa*s (measured with a Brookfield® viscometer at 20 rpm and 25° C.) and a pH of 12.4.

Preparation of a Polyurethane Water Soluble Hydrophilic Polymer

A comb polyurethane was prepared following the procedure of Example 4 of WO 2010/106022.

The obtained product (PU1) has a dry matter content of 25.2% by weight, a viscosity of 215 mPa*s (measured by Brookfield® viscometer at 20 rpm and 25° C.) and a pH of 7.4.

Examples 1-6

Aqueous polymer compositions of the invention, Examples 2-5, that contain the polyacrylic thickener AT1, were compared with the comparative composition of Example 1, prepared at pH below 5.5 with a thickener of the known art (Viscolam GP 37, a ethyl acrylate/methacrylic acid copolymer commercialized by Lamberti S.p.A.) and with the comparative composition of Example 6, also containing Viscolam GP 37 and prepared according to the procedure of US 2010/0184897.

The aqueous polymer compositions were prepared adding, under vigorous stirring with a mechanical rod stirrer, the polyacrylic thickeners to each of the water soluble hydrophilic polymers PE1, PU1 and Rheocarb® 100 (a comb acrylic polymer commercialized by Coatex SA).

The compositions were diluted with water to bring the dry matter content to 25% by weight.

No pH correction were performed on the compositions of Examples 1-5, the pH of the composition of Example 6 was corrected with NaOH.

The quantity in grams of each component of the compositions are reported in Table 1.

The aqueous polymer compositions were characterized by performing the following measurements:

pH;

Brookfield@ Viscosity (mPa*s), 100 rpm and 25° C., immediately after preparation (viscosity);

Brookfield@ Viscosity (mPa*s), 100 rpm and 25° C., after 2 months from preparation (2 months viscosity);

stability after 24 hour from preparation (24 hours stability);

stability after 2 months from preparation (2 months stability).

The results are reported in Table 2.

TABLE 1

|  | Example 1* | Example 2 | Example 3 | Example 4 | Example 5 | Example 6* |
|---|---|---|---|---|---|---|
| PE1 | 170 | 170 |  |  |  |  |
| PU1 |  |  |  | 170 |  |  |
| RHEOCARB 100 |  |  | 170 |  | 170 | 170 |
| AT1 |  | 25.9 | 24.0 | 25.9 | 26.5 |  |
| VISCOLAM GP37 | 26.0 |  |  |  |  | 25.5 |
| WATER | 4.1 | 4.1 |  | 4.1 | 5.5 | 3.2 |

*comparative

TABLE 2

|  | pH | viscosity | 24 hours stability | 2 months viscosity | 2 months stability |
|---|---|---|---|---|---|
| Example 1* | 4.6 | 127 | Phase Separation | — | — |
| Example 2 | 4.3 | 120 | Stable | 150 | Stable |
| Example 3 | 5.3 | 620 | Stable | 780 | Stable |
| Example 4 | 5.4 | 240 | Stable | 320 | Stable |
| Example 5 | 4.0 | 412 | Stable | 500 | Stable |
| Example 6* | 6.1 | 170 | Stable | 680 | Stable |

*comparative

The aqueous polymer compositions are considered stable when no phase separation or precipitation or gelification occur.

Applicative Examples

Paper coating compositions based on 100% carbonate (Hydrocarb 90, 77% slurry in water, from Omya, CH) were prepared using PU1, PE1 and the aqueous polymer compositions of Examples 2-4 and 6.

The components of the paper coating compositions are reported in parts by weights of dry matter in Table 3.

The paper coating compositions were characterized by performing the following measurements:

pH;

Brookfield@ Viscosity, 100 rpm and 25° C. (viscosity);

Dry Matter, with a IR moisture analyzer (dry matter);

Water Retention according to Tappi Method T710 (water retention).

The data obtained are reported in Table 4.

TABLE 3

| Components | Example 7* | Example 8* | Example 9* | Example 10 | Example 11 | Example 12 |
|---|---|---|---|---|---|---|
| HYDROCARB 90 | 100 | 100 | 100 | 100 | 100 | 100 |
| LATEX[1] | 10 | 10 | 10 | 10 | 10 | 10 |

TABLE 3-continued

| Components | Example 7* | Example 8* | Example 9* | Example 10 | Example 11 | Example 12 |
|---|---|---|---|---|---|---|
| OBA[2] | 1 | 1 | 1 | 1 | 1 | 1 |
| PE1 |  | 0.4 |  |  |  |  |
| PU1 |  |  | 0.4 |  |  |  |
| Example 2 |  |  |  | 0.4 |  |  |
| Example 3 |  |  |  |  | 0.4 |  |
| Example 4 |  |  |  |  |  | 0.4 |
| Example 6* | 0.4 |  |  |  |  |  |

[1] Binder, DL 1065, Dow Chemical Co., US
[2] Optical brightener, Tinopal ABP-Z, Basf, DE
*comparative

TABLE 4

|  | Example 7* | Example 8* | Example 9* | Example 10 | Example 11 | Example 12 |
|---|---|---|---|---|---|---|
| dry matter (%) | 71.95 | 71.92 | 71.90 | 71.92 | 71.93 | 71.88 |
| pH | 9.02 | 9.01 | 9.10 | 9.13 | 9.05 | 9.00 |
| viscosity (mPa · s) | 1754 | 1234 | 1280 | 1988 | 2208 | 2012 |
| water retention (g/m$^2$) | 135 | 141 | 143 | 131 | 126 | 138 |

*comparative

The paper coating compositions of the invention show higher viscosities compared with the composition containing only PE1 or PU1 and a viscosity comparable with the composition of the prior art.

The paper coating compositions were applied (13 g/m$^2$) on offset sheets (80 g/m$^2$); the sheets were conditioned for 24 h at 21° C. and 50% r.h. and calendared (cylinders temperature 55° C., pressure 67.5 Kg/cm; 4 nips). Brightness and gloss @75° were measured using the methods Tappi T452 and T480 respectively and the results are reported in Table 5.

TABLE 5

| Samples | ° Brightness | Gloss @ 75° |
|---|---|---|
| EXAMPLE 7* | 97.8 | 83.1 |
| EXAMPLE 8* | 97.7 | 84.1 |
| EXAMPLE 9* | 97.7 | 84.0 |
| EXAMPLE 10 | 97.6 | 82.3 |
| EXAMPLE 11 | 97.7 | 83.8 |
| EXAMPLE 12 | 98.5 | 82.6 |

*comparative

The results reported above confirm that the aqueous polymer compositions of the invention have good thickening and water retention properties and at the same time maintain the activity as gloss enhancer for paper coating compositions.

The invention claimed is:

1. An aqueous polymer composition comprising:
    A) a water soluble hydrophilic polymer with a poly(ethylene oxide) content higher than about 50% by weight; and
    B) a polyacrylic thickener obtained by polymerization of:
        a) from about 0.1 to about 20% by weight of a monoethylenically unsaturated monomer containing a sulfonic acid group or a salt thereof;
        b) from about 20 to about 70% by weight of a (meth)acrylic acid ester;
        c) from about 20 to about 50% by weight of a monoethylenically unsaturated monomer containing one or more carboxylic groups;

d) from about 0 to about 3% by weight of a polyethylenically unsaturated monomer; and
e) from about 0 to about 15% by weight of a nonionic acrylic associative monomer,
wherein:
a weight ratio between the water soluble hydrophilic polymer and the polyacrylic thickener is from about 60/40 to about 90/10; and
a sum of the percentages of A) and B) is from about 10 to about 40% by weight of the composition itself.

2. The aqueous polymer composition of claim 1 wherein the polyacrylic thickener B) is obtained by polymerization of:
a) from about 1 to about 10% by weight of the monoethylenically unsaturated monomer containing a sulfonic acid group or a salt thereof;
b) from about 40 to about 70% by weight of the (meth) acrylic acid ester;
c) from about 30 to about 45% by weight of the monoethylenically unsaturated monomer containing one or more carboxylic group;
d) from about 0 to about 1% by weight of the polyethylenically unsaturated monomer; and
e) from about 0 to about 15% by weight of a nonionic acrylic associative monomer.

3. The aqueous polymer composition of claim 1 in which the weight ratio between the water soluble hydrophilic polymer A) and the polyacrylic thickener B) is from about 80/20 to about 90/10.

4. The aqueous polymer composition of claim 1 wherein the water soluble hydrophilic polymer A) has a poly(ethylene oxide) content higher than about 80% by weight.

5. The aqueous polymer composition of claim 1 wherein the water soluble hydrophilic polymer is an acrylic anionic copolymer.

6. The aqueous polymer composition of claim 1 wherein the water soluble hydrophilic polymer A) has a backbone selected from the group comprising a polyacrylic backbone, a polyurethane backbone, and a polyether backbone.

7. The aqueous polymer composition of claim 6 wherein the water soluble hydrophilic polymer A) has a polyurethane backbone and is a non-ionic comb polyurethane comprising a main chain containing urethane and urea linkages with branch points from each of which a poly(ethylene oxide) side chain emanates, the comb polyurethane being characterized by the fact that the poly(ethylene oxide) side-chains have a molecular weight higher than about 500 and a poly(ethylene oxide) content of from about 80 to about 99.9% by weight.

8. The aqueous polymer composition of claim 6 wherein the water soluble hydrophilic polymer A) has a polyurethane backbone and is a water soluble comb non-ionic polyurethane comprising a main chain containing urethane and urea linkages with branching points from each of which a linear poly (ethylene oxide) side-chain having molecular weight higher than about 500 emanates, the comb polyurethane being characterized by having a poly(ethylene oxide) content higher than about 60% by weight and by having poly(propylene oxide) content from about 5 to about 30% by weight.

9. The aqueous polymer composition of claim 6 wherein the water soluble hydrophilic polymer A) has a polyether backbone and is a polyether having a poly(ethylene oxide) content higher than about 60% by weight obtained by reacting:
a) 1 equivalent of a polyol which is the reaction product of 1 equivalent of a monofunctional alcohol containing a poly(ethylene oxide) chain, —(CH$_2$CH$_2$O)$_n$—, in which n is a number running from about 15 to about 500, and 1 equivalent of a diglycidyl ether of formula (I):

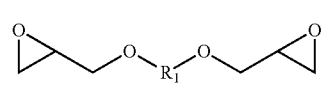

wherein:
R$_1$ is the radical (i):

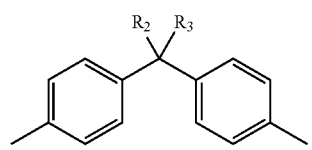

and R$_2$ and R$_3$ are each independently methyl, ethyl or hydrogen;
R$_1$ is phenylene, optionally substituted with one or more alkyl group;
R$_1$ is biphenylene, optionally substituted with one or more alkyl group;
R$_1$ is the radical (ii):

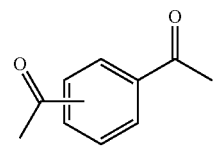

or
R$_1$ is a linear or branched aliphatic alkylene radical containing from about 2 to about 6 carbon atoms;
b) from about 0.4 to about 1.3 equivalents of a diglycidyl ether of formula (I); and
c) from about 0 to about 1 equivalent of a monofunctional alcohol.

10. The aqueous polymer composition of claim 9 wherein the polyether is obtained by reacting 1 equivalent of polyol a) with from about 0.4 to about 0.9 equivalents of diglycidyl ether b) of formula (I) in which R1 is the radical (i) in which R2, R3 are methyl groups and with about 0 equivalents of monofunctional alcohol c).

11. A paper coating compositions comprising:
a) from about 30 to about 80% by weight of an inorganic pigment;
b) from about 0.05 to about 5.0 parts by weight each 100 parts by weight of pigment of the aqueous polymer composition of claim 1; and
c) at least about 15 % by weight of water.

12. The paper coating compositions of claim 11 further comprising from about 0.01 to about 3% by weight of a dispersing agent.

13. The paper coating composition of claim 12 further comprising from about 1 to about 15% by weight of a binder.

14. The paper coating compositions of claim 11 in which the inorganic pigment is selected from the group consisting of kaolin, calcium carbonate, talc, titanium dioxide, barium sulfate, gypsum and mixtures thereof, and has a Brookfield® viscosity at 25° C. and 100 rpm of less than about 3,200 mPa*s.

15. The paper coating compositions of claim 14 further comprising from about 0.01 to about 3% by weight of a dispersing agent.

16. The paper coating composition of claim 15 further comprising from about 1 to about 15% by weight of a binder.

* * * * *